United States Patent [19]

Gaffrig

[11] Patent Number: 4,622,850

[45] Date of Patent: Nov. 18, 1986

[54] MARINE PITOT TUBE

[76] Inventor: James W. Gaffrig, 5212 N. Glenwood Ave., Chicago, Ill. 60640

[21] Appl. No.: 733,489

[22] Filed: May 10, 1985

[51] Int. Cl.⁴ .............................................. G01C 21/00
[52] U.S. Cl. ........................................................ 73/182
[58] Field of Search ............... 73/182, 861.65, 861.66, 73/861.62, 861.68

[56] References Cited

U.S. PATENT DOCUMENTS 1,869,962  8/1932  Golden .................................. 73/182

Primary Examiner—Donald O. Woodiel
Attorney, Agent, or Firm—Norman Lettvin

[57] ABSTRACT

A pressure operated speed indicating system for a vehicle operating in a fluid, such as a speed boat, has a mounting bracket which enables a pressure sensing or pitot tube having a pressure sensing opening to be placed in an optimum position with respect to the boat. The mounting bracket grips the strongest portion of the tube to minimize tube deformation or breakage in use. The mounting bracket also assures that the pressure sensing opening of the pitot tube will remain in a forward facing position substantially transverse to the longitudinal axis of the boat. An improved connection fitting for connecting the pitot tube to a resilient conduit placing the tube in fluid pressure transmitting communication with a pressure operated speedometer is also provided. This fitting facilitates installation or replacement of a pitot tube in the system. The fitting contains a fluid flow damping orifice which dampens fluctuations in the fluid pressure imposed on the sensing opening and transmitted through the fitting to the pressure operated speed indicating gauge.

8 Claims, 10 Drawing Figures

U.S. Patent     Nov. 18, 1986     4,622,850
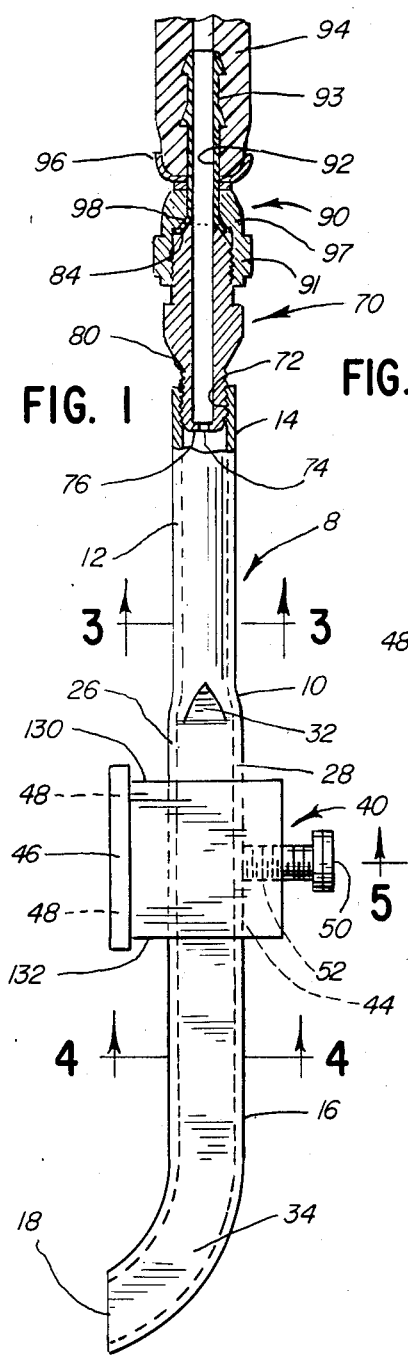

MARINE PITOT TUBE

BACKGROUND OF THE INVENTION

1. Field of the Invention

This invention relates to fluid pressure sensing pitot tubes used to operate pressure actuated speedometers on high speed water going vehicles, such as power boats.

2. Description of the Prior Art

Pitot tubes are currently used in measuring the velocity of an object, such as a high-powered speed boat, with respect to the water the boat is moving through. A pitot tube having a forward facing pressure sensing opening is typically attached to the hull of the boat at a point, such as a lower portion of the transom, to maintain the sensing opening substantially beneath the water during foward movement of the boat, including during high speed operating conditions in which the boat is planing or skimming across the surface of the water. The pressure exerted by the water is imposed on the forward facing sensing opening.

Connected to the pitot tube is a pressure operated speedometer which is in fluid pressure receiving communication with the sensing opening. Upon forward movement of the boat pressure exerted on the sensing opening is transmitted to the pressure actuated speedometer. The speedometer is calibrated to translate the received pressure, which is substantially directly proportional to the speed of the boat, into standard speed indicating units, such as miles per hour or knots per hour, to provide an indication of the speed of the boat.

One type of prior art pitot tube for boats consists of a mounting plate with the sensing tube welded directly to the plate. The plate is typically affixed to the transom of a boat using fasteners, such as screws. Once mounted on a boat the tube cannot be readily adjusted up or down to place the sensing opening in an optimum vertical position with respect to the boat. Additionally, if the tube is broken or deformed due to impact with an object in the water, the mounting plate and tube must both be replaced.

Other prior art pitot tubes are mountable on separatable mounting brackets. The mounting bracket has a mounting plate affixed to the boat and a tube holder is secured to the mounting plate. The tube may be removed from the holder and replaced without removal of the mounting plate. A pitot tube receiving passage having a circular cross section is provided in the tube holder and the pitot tube is slid longitudinally into the tube receiving passage of the bracket. Such prior art pitot tubes typically have a connection portion and a sensing portion in which the connection portion is circular in cross section to facilitate engagement with a threaded connector and the sensing portion is flattened or elongated in cross section for strength. A clamping arrangement, such as a set screw, is tightened against a peripheral portion of the tube to maintain the tube in the desired position.

The adjustable prior art tube holders can only receive the circular cross section connection portion of the tube. Consequently, the flattened or elongated sensing portion of the tube extends downwardly, or is cantilevered, a substantial distance below the bracket. The portion of the tube having the circular cross section is much weaker than the flattened sensing portion. Thus, such a tube, due to the inherent weakness of the cross sectional portion held by the tube holder, is readily susceptible to being deformed or broken off when it contacts an object in the water. Also, the tube is susceptible to being rotated about its longitudinal axis due to each the passage and the portion of the tube received within the passage having a circular cross section. If the set screw is insufficiently tight, or if the pressure sensing end of the tube contacts an object, the tube may turn in the passage to cause the sensing opening to be turned or deflected from its correct forward facing position. Having the sensing opening facing in an incorrect direction may provide an erroneous speed indication and, also, the fact that the sensing opening is not in its correct position would not be readily evident to, or detectable by, a person on the boat.

In the prior art pitot tubes a resilient connecting tube typically is used to connect an upper or connection end of the tube to the speedometer. A fitting between the pitot tube and connection tube has a first end which is threadedly engaged with the pitot tube and a second end has a resilient tube receiving nipple. An end of the resilient hose is slid longitudinally onto the nipple and maintained engaged with the nipple by a circumferential clamp. Once the initial resilient tube to nipple connection is made it is cumbersome and time consuming to remove the hose from the nipple. Therefore, awkward as it is, the pitot tube is generally disconnected from the resilient hose by holding the threaded fitting and rotating the pitot tube about its longitudinal axis. Changing a pitot tube in this manner can be a tedious, time-consuming task.

Also, prior art marine pitot tube speed indicating systems typically display an exasperating condition known as "needle jump" in which the needle of the pressure operated speedometer wildly waggles to and fro on its pivot mount. This condition is caused by rapid fluctuations in pressure occurring at the sensing opening of the pitot tube. The pressure conveying opening between the sensing opening and the speedometer is typically open or unimpeded throughout its length. Consequently, the fluctuations in pressure which occur at the sensing opening are transmitted directly to the pressure operated speedometer during conditions, such as buffeting, in which a boat is traveling sufficiently fast to skip from wave crest to wave crest, whereby the sensing opening is sporadically or intermittently immersed in and removed from the water.

SUMMARY OF THE INVENTION

A pitot tube assembly for speed boats is comprised of a pitot tube having a connection portion and a sensing portion. The connection portion is circular in cross section and the sensing tube portion is flattened in cross section. A mounting bracket is comprised of a mounting plate for engagement with an appropriate portion of the boat and a pitot tube mounting block. The mounting block has a tube receiving and retaining passage which can longitudinally slidably receive each the circular cross-sectional connection portion and the flattened or elongated cross-sectional sensing portion of the pitot tube. Thus, the bracket can be affixed to the boat closely adjacent the bottom of the boat because the pitot tube can be held in the mounting block by its lower sensing portion. Due to the increased strength of the sensing portion and the relatively short length between the mounting bracket and the sensing opening of the tube, the tube is much less susceptible to being deformed or sheared off during use.

The tube receiving and retaining passage of the mounting block also serves to positively maintain the pressure sensing opening of the tube correctly positioned with respect to the boat.

The connection end of the pitot tube is connected to a resilient conduit by a fitting having threaded portions at each of its two ends and a pressure dampening orifice is formed in one of the ends of the fitting. The dampening orifice serves to reduce "needle jump" of the speedometer when the sensing opening is subjected to fluctuations in pressure. A swivel-type connector is threadedly engaged with the other end of the fitting to facilitate ease of installation or replacement of the pitot tube.

BRIEF DESCRIPTION OF THE DRAWINGS

FIG. 1 is a side elevation view of a pitot tube of this invention, showing the tube affixed in a desired position by its position orienting mounting bracket and having the upper end of the tube connected in fluid flow communication with a pressure conveying conduit connectable to a speedometer (not shown);

FIG. 2 is a front elevation view of the pitot tube shown in FIG. 1;

FIG. 3 is a cross sectional view of the tube shown in FIG. 1, as indicated by the section line 3—3;

FIG. 4 is a cross sectional view of the tube shown in FIG. 1, as indicated by the section line 4—4;

FIG. 5 is a cross sectional view of the tube and bracket shown in FIG. 2, as indicated by the section line 5—5;

FIG. 6 is a fragmentary top plan view of the tube mounting block shown in FIG. 5 and clearly showing the configuration of the pitot tube receiving opening in the block, with the pitot tube indicated in phantom lines within the opening;

FIG. 7 is a side elevation view of a connective fitting having a fluid flow impeding orifice for dampening transmission of fluid pressure;

FIG. 8 is a cross section view of the fitting of FIG. 7, as indicated by the section lines 8—8;

FIG. 9 is a side elevation view of a portion of a boat showing the pitot tube mounted on a portion of a typical boat hull in an operative position and connected in fluid pressure transmitting communication with a pressure operated speedometer; and FIG. 10 is a side elevation view of a portion of a boat of the type having offset transom portions and showing a pitot tube of this invention mounted to a portion of the transom.

DETAILED DESCRIPTION OF THE INVENTION

FIG. 1 is a side elevation view of a marine pitot tube assembly 8 of this invention and FIG. 2 is a front elevation view of assembly 8. Assembly 8 is comprised of a pitot tube 10 having an upper connection portion 12 having an upper terminal connective end portion 14 and a lower sensing portion 16 having a lower terminal sensing end 18 defining a forward facing sensing opening 20, as best shown in FIG. 2.

The upper connection portion 12 of tube 10 has a circular cross section, as shown in FIG. 3, and the lower sensing portion 16 of tube 10 has a cross section defined by a pair of substantially opposed flat walls 22 and 24 joined at each of their two sides by a pair of curved wall sections 26 and 28 to form a conduit having a substantially elongated passageway 30 which extends through the sensing portion 16 of tube 10 from sensing opening 20, through a transition area 32 and through connection portion 12 of tube 10.

Sensing tube portion 16 has, as best shown in FIG. 1, a lower curved portion 34 which projects the sensing opening 20 forward of the main body of the tube 10 and terminal end 18 is cut off at an angle which is substantially parallel to the longitudinal axis of the tube 10 whereby sensing opening 20 is positioned forward of the main body of tube 10 and extends substantially parallel to the longitudinal axis or axial plane of the tube 10.

Sensing tube portion 16 of pitot tube 10 is preferably formed of an appropriate length of stainless steel tubing which is circular in cross section. Pitot tube 10 is formed by bending the circular tube to obtain the desired angular portion 34 and, using suitable tooling and force imposing means, forcing two diametrically opposed wall portions of the circular tube inward to obtain the two flat walls 22 and 24 and the two joining curved wall portions 26 and 28, as best shown in FIG. 4. As shown, sensing portion 16 has a relatively long axis parallel to the flat wall 22 and 24 and a relatively short axis normal to the flat walls. Also, the distance between the outer-most peripheral surfaces of the curved wall portions is significantly greater than the outside diameter of connective portion 12 of tube 10, as best shown in FIG. 1.

Forming the sensing portion 16 of the tube 10 in this configuration in this cold working manner greatly increases the strength of sensing portion 16 of the tube relative to the resistance to deformation or shear of portion 12. Thus when, as in the system of this invention, the strengthened tube portion 16 is supportedly engaged with a mounting bracket it is much less susceptible to being deformed or sheared off when installed in a desired position on the hull of a speed boat. In one embodiment of the tube assembly a tube formed of 304 stainless steel having a wall thickness of about 0.060 of an inch was used.

An adjustable pitot tube mounting means, such as a mounting bracket 40, is used to mount tube 10 in a desired operative position on a suitable portion of a boat hull, such as a lower portion of the transom.

Bracket 40 is comprised of a tube holder block or body 42 having a tube recieving passage 44 extending through it, as shown in FIGS. 1, 2, 5 and 6. A mounting means, such as a mounting plate 46, is affixed to bracket block 42 by suitable means, such as welding. Appropriate fastener engaging means, such as a plurality of fastener receiving openings 48, are provided in mounting plate 46 to facilitate substantially rigid attachment of the bracket 40 to a suitable portion of a boat.

An adjustable pitot tube holding means, such as a set screw 50, is threadedly engaged with a tapped opening 52 formed transverse to the tube receiving opening 44 in block 42. As best shown in FIGS. 5 and 6, opening 44 has a circular cross section appropriately sized to receive and longitudinally slidably allow passage of connection portion 12 of tube 10 through it together with a substantially diametrically opposed pair of radially outwardly extending grooves or lobes 60 and 62. Lobes 60 and 62 are appropriately sized to longitudinally slidably receive the curved wall portions 16 of the tube 10.

An inner terminal end 64 of the set screw 50 is positioned to be turned into substantial frictional engagement with the outer peripheral surface of curved wall portion 28 of tube 10 whereby, with screw 50 turned into a non-tube engaging position, tube 10 can be positioned in a desired axial position with respect to the bracket block 42. Upon achievement of the desired position, the set screw 50 is then torqued inward to place terminal end 64 in substantial frictional engagement with a portion of the outer surface of wall portion 62 to maintain the tube 10 substantially locked in the desired axial position. The position of the tube can subsequently be longitudinally adjusted up or down as desired by loosening set screw 50, sliding tube 10 to the desired new position and then retightening the screw 50. Preferably, the bracket, mounting plate and set screw are also formed of a corrosion resistant material, such as, for example, 304 stainless steel.

As best shown in FIG. 1, sealingly connected in fluid flow or pressure transmitting engagement with connective end 14 of tube 10 is an appropriate fitting 70 threadedly engaged with female threads 72 in tapped end 14.

A dampening orifice 74 is provided in a transverse member or plate 76 of the fitting 70, as shown in each FIGS. 1 and 8. Orifice 74 is sized to be substantially smaller than the internal diameter of passage 30 of tube portion 12 whereby pressure fluctuations transmitted through the orifice are substantially damped or attenuated by the orifice. Depending on the application involved, an orifice having a diameter in the range of about 0.020 to 0.050 of an inch will be effective. Generally speaking, the smaller the orifice the greater the dampening. However, too small an orifice is susceptible to being plugged or inoperatively closed by particulate matter or corrosion. An orifice having a diameter of about 0.030 of an inch has been found to be effective in one embodiment. As best shown in FIG. 7, fitting 70 has a first end 80 having a threaded portion for being removably sealingly engaged with the threads 72 of end 14 and a second end portion 82. End portion 82 has a truncated cone shaped end portion 84 and a threaded portion for being removably sealingly engaged with female threads provided within a suitably sized swivel-type connection fitting 90.

Swivel-type connection fitting 90 has a first end portion 91 threaded for sealing engagement with connection member 70 and a second end portion 92 having a tube receiving nipple 93 for receiving an end of a resilient tube 94. A cup-shaped member 96 is placed around the end of the tube and crimped or swaged radially inwardly to maintain the resilient tube 94 engaged with the fitting 90. Nipple 93 and the member 96 are engaged with body member 97 of fitting 90 by an internally positioned flange 98. Flange 98 has a conical seat whereby when the conical end 84 of member 70 is sealingly engaged with member 90 the connection body 97 of member 90 is prevented from swivelling or rotating about its longitudinal axis with respect to nipple 93 and hose 94. Also, conical seat 84 is sealingly engaged with flange 98. Therefore, a fluid pressure transmitting passageway 30 is provided from sensing opening 20 though pitot tube 10 to a pressure operated speed indicating device such as the pressure operated speedometer 108 shown in FIG. 9. However, when the members 70 and 90 are loosened with respect to each other body member 97 can be swivelled or rotated with respect to the nipple 93 and also with respect to the resilient hose 94 which is sealingly engaged with the nipple 93. This arrangement facilitates disengagement of connector member 90 and resilient tube 94 from connector fitting 70 as only the body member 97 needs to be rotated about its longitudinal axis. The pitot tube can be held in one position and thus can even remain in its operative position in the mounting bracket while the connection to the resilient hose is being removed.

FIG. 9 is a side elevation, substantially schematic, view of pitot tube assembly 8 affixed to an appropriate portion, such as a transom 100, of a boat. A plurality of threaded fasteners, such as screws 102, are passed through openings 48 of mounting plate 46 and into the hull 100 to affix bracket 40 to the boat. With connector 70 removed from engagement with end 14 of tube portion 12 the end 14 can be slid through passage 44 and moved upwardly to engage the tube sensing portion 16 with the lobes 60 and 62 of opening 44. When the tube 10 is axially positioned at the desired point in bracket 40 the set screw 50 is tightened to maintain the tube in that desired position and the lobes also assure that the tube will remain oriented properly with the sensing opening 20 facing forward, substantially as shown in FIGS. 1, 9 and 10.

Connector 70 is then sealingly engaged with end 14 of tube 10 to place a pressure operated speed indicating means, such as a pressure operated speedometer 108 having speed indicating indicia 110, in pressure transmitting communication with the sensing opening 20 of pitot tube 10. An indicating device, such as a pivotally mounted needle 112, is moved with respect to the indicia 110 in response to the magnitude of the pressure at the sensing opening 20 to indicate the speed of the boat as a function of the magnitude of the pressure exerted on the opening 20.

FIG. 10 shows a pitot tube assembly 8 of this invention mounted on a speed boat hull 120 of the offset transom type in which a lower portion 122 of the transom is offset longitudinally inward from an upper transom portion 124. A pitot tube assembly 8 provided for such an application may be provided with a shortened or reduced length tube connection portion 12 to accommodate the reduced vertical mounting space available in this type of hull.

Referring to FIG. 1, mounting block 42 has an upper surface 130 and a lower surface 132. When installing a pitot tube 10 on a transom of a boat, as shown in FIGS. 9 and 10, it is desirable to mount the end 18 of sensing portion 16 as close as possible to the lower surface 132 of mounting block 42. The sensing opening 20 must extend below the lowermost surface of the transom to have the entire opening exposed to the water over which the boat is moving. However, any excess extension of the tube from the bracket increases the moment of force imposed on the bracket by the downwardly extending portion of the tube. Thus, it is desirable to mount the bracket as low as possible on the transom and extend the tube just for enough downward to have the sensing opening pointing directly forward substantially parallel to the longitudinal axis of the boat and fully exposed to the water over which the bottom of the boat travels.

When a boat having a pitot tube of this invention mounted on it is placed in water, such as shown in FIGS. 9 and 10, the sensing or pitot tube 10 and resilient conduit or tube 94 are normally occupied by air at ambient air pressure. As the pitot tube is immersed in the water, water enters opening 20 and, compresses the air occupying the system between the sensing opening and the speedometer in proportion to the amount of immersion, i.e. dependent upon the draft of the hull, until the water pressure is equalized by the force imposed by the air compressed in the system. The speedometer would then be adjusted or set to a zero speed indication on the speed indication indicia.

Forward motion of the boat will impose an additional pressure on the sensing opening 20 substantially in direct proportion to the rate of the forward motion. The additional pressure so imposed is transmitted through the conduit 94 and imposes that pressure on an appropriate pressure sensing means, such as the well-known bourdon tube, of the speedometer increased pressure is translated into appropriate standard units of speed, such as knots per hour or miles per hour, by the needle of the speedometer coacting with appropriate indicia.

Water will normally extend above end 14 of tube 10 and thus flow through orifice 74 and occupy a portion of tube 94 above the orifice. Due to the restriction to flow provided by the flow impeding or restrictive orifice flow of water from one side to the other of orifice 74 is damped or retarded. This retardation of the rate of flow serves to smooth out or dampen rapid changes in pressure occurring at the sensing opening and being transmitted to the speedometer through the orifice. Such rapid increases and rapid decreases in pressure are effectively reduced to aid in preventing erratic operation or "needle jump" of the speedometer. Any of a number of well-known and commercially available marine-type pressure operated speedometers may be used with the pressure sensing system of this invention.

While a particular embodiment of this invention has been shown and described, it will be obvious to those skilled in the art that various changes and modifications may be made therein without departing from the spirit and scope of the invention and, therefore, it is intended in the appended claims to cover all such changes and modifications which fall within the true spirit and scope of the invention.

What is claimed is:

1. In a speed indicating system for a boat, said system being of the pressure responsive type having a pitot tube with a sensing opening connected in pressure transmitting communication with a pressure operated speedometer, said pitot tube having a longitudinal axis and said pitot tube having a connection portion having a circular cross section and a sensing portion having a pair of substantially flattened walls laterally spaced from each other and connected at each of two sides by a curved connective wall portion for forming a cross section having a long axis parallel to said flattened walls and a short axis normal to said bottom walls, the length of the long axis of said sensing portion being greater than the diameter of said connection portion, said sensing portion of said pitot tube having a terminal end portion having a sensing opening for receiving fluid pressure and said connection portion of said pitot tube having a terminal end having a portion for being removably sealingly engaged with a connection fitting, said fitting being engaged in fluid pressure transmitting communication with said pressure operated speedometer, an improved mounting bracket for mounting said pitot tube to a portion of a boat, said mounting bracket comprising, in combination:

mounting means for being rigidly engaged to a boat;
   a pitot tube mounting member fixedly engaged with said mounting means, said mounting member having an upper surface portion and a lower surface portion and a pitot tube receiving opening extending from said upper surface portion to said lower surface portion, said pitot tube receiving passage being structured and arranged for longitudinally slidably receiving each said connected portion of said pitot tube and said sensing portion of said pitot tube;
   means for selectively maintaining said pitot tube in a desired longitudinal position with respect to said mounting member whereby said sensing opening may be selectively positioned in an optimum position below said lower surface of said mounting member; and
   said receiving opening including a passage circular in cross section and sized for longitudinally slidingly receiving said connection portion of said pitot tube and a pair of substantially diametrically opposed grooves extending along said circular cross section passage for longitudinally slidingly receiving said cureved connective wall portions of said sensing portion of said tube.

2. The invention defined in claim 1 in which said grooves are formed along said passageway along a diametrical axis of said passageway which is substantially normal to said mounting means of said bracket for maintaining said sensing opening of said pitot tube facing in a desired position with respect to said mounting bracket.

3. The invention defined in claim 1 in which said position maintaining means for said pitot tube is a threaded set screw.

4. The invention defined in claim 1 in which said mounting means includes a mounting plate having a plurality of threaded fastener receiving openings.

5. The invention defined in claim 4 in which said mounting plate is formed of stainless steel and said pitot tube mounting member is a stainless steel block welded to said mounting plate and said pitot tube receiving passageway extends through said block from an upper surface to a lower surface of said block.

6. In a speed indicating system for a boat, said system being of the pressure responsive type having a pitot tube with a sensing opening connected in pressure transmitting communication with a pressure operated speedometer, said pitot tube having a longitudinal axis and said pitot tube having a connection portion having a circular cross section and a sensing portion having a pair of substantially flattened walls laterally spaced from each other and connected at each of two sides by a curved connective wall portion for forming a cross section having a long axis parallel to said flattened walls and a short axis normal to said bottom walls, the length of the long axis of said sensing portion being greater than the diameter of said connection portion, said sensing portion of said pitot tube having a terminal end portion having a sensing opening for receiving fluid pressure and said connection portion of said pitot tube having a terminal end having a threaded interior portion for being removably sealingly engaged with a threaded connection fitting, said fitting being engaged in fluid pressure transmitting communication with said pressure operated speedometer, an improved connecting structure for connecting said pitot tube to an end portion of a resilient conduit connected to said pressure actuated speedometer, said connection structure comprising, in combination:

a first fitting member having a fitting body having an internally threaded end portion and a resilient tube receiving nipple end portion, said tube receiving nipple having a longitudinal axis and said tube receiving nipple being engaged with said fitting body for rotation of the fitting body about the longitudinal axis of said nipple;

a second fitting member having a fitting body having a first threaded end portion for being sealingly engaged with said internally threaded end portion of said fitting member and a second threaded end portion for being sealingly engaged with said internally threaded end portion of said connection end of said pitot tube whereby said resilient tube can be placed in fluid pressure transmitting communication with said pitot tube by turning said second fitting member into sealing fluid flow communication with said pitot tube and said first fitting member is then threadedly engaged with said first end of said second fitting member for sealingly engaging said first fitting member into fluid flow engagement with said second fitting member; and said second end of said second fitting member includes a fluid flow restriction for dampening fluid pressure fluctuations transmitted through said tube from said sensing opening to said pressure operated speedometer.

7. For use with a speedometer on a motor boat wherein a pitot rube depends from the boat to be immersed in the body of water upon which the boat moves, the pitot tube and speedometer being interconnected to indicate on the speedometer the boat's speed in the body of water;

the improvement comprising in combination:

bracket means including a planar mounting plate and a bracket block secured to and projecting transversely from the mounting plate; the mounfing plate being adapted for securement to the boat's hull below the surface of the body of water in which the boat is to move;

the bracket block having a tube receiving, slide passage extending through it, said slide passage being located spaced from but extending parallel to the mounting plate, the slide passage being shaped to include a substantially cylindrical bore that is enlarged by a pair of diametrically opposed, radially outwardly extending longitudinal grooves, that lie in a plane that passes through the diameter of the bore and projects prependicularly to the plane of the planar mounting plate;

the pitot tube including an upper, tubular, cylindrical cross-section connection portion, of a size to slide through said cylindrical bore portion of the slide passage and to be positioned above the bracket block, and a lower sensing portion that is of a length that permits it to be positioned to extend through the bracket block, said lower sensing portion of the tube being shaped to form a cross-section that includes a pair of elongated, spaced, opposite flat walls joined at each of their adjacent, longitudinal edges by a pair of curved wall sections, the transverse size and shape of said lower sensing portion of the tube being selected to slidable extend into and along the length of the pair of radially outwardly extending longitudinal grooves in the bracket block;

a tapped set-screw bore in the bracket block, the axis of said bore being aligned with the plane of the radially outwardly extending grooves formed in the cylindrical block;

and a selectively manually actuatable set screw in said set screw bore adapted for selectively clamping the pitot tube in a selected position within the tube receiving slide passage of the bracket block.

8. A construction as in claim 7 wherein the upper end portion of the pitot tube sealing connects to a flow fitting that has a transverse wall with a dampening orifice therein, whereby fluctuations in water pressure developed in the pitot tube are dampened in the transmittal of water pressure from the pitot tube to the boat's speedometer.

* * * * *